Feb. 7, 1928.

M. WEISS 1,658,699

PRESSURE DIFFERENCE MEASURING INSTRUMENT

Filed March 6, 1925

Inventor:
Max Weiss,
by *Alexander S. [illegible]*
His Attorney.

Patented Feb. 7, 1928.

1,658,699

UNITED STATES PATENT OFFICE.

MAX WEISS, OF BERLIN-FRIEDENAU, GERMANY, ASSIGNOR, BY MESNE ASSIGNMENTS, TO BAILEY METER COMPANY, A CORPORATION OF DELAWARE.

PRESSURE DIFFERENCE MEASURING INSTRUMENT.

Application filed March 6, 1925, Serial No. 13,570, and in Germany June 19, 1924.

The present invention relates to instruments such as are embodied in flow meters and the like for measuring a pressure or a pressure difference and especially to such instruments of the so-termed transformer type which comprise a primary winding connected to a source of alternating current and to suitable measuring instruments, and a second winding in the form of a closed loop which may be formed of a liquid such as mercury, and the resistance of which is adapted to be varied in accordance with the pressure or pressure difference to be measured whereby the current flowing in the primary windings is varied. The resistance of the liquid loop is caused to vary by its level being varied and lowered in the annular chamber in which it is located. An instrument of this general type is disclosed and claimed in the application of Thompson and McNairy, Serial No. 632,759, filed April 17, 1923, now Patent No. 1,560,951, Nov. 10, 1925.

The object of the invention is to provide an improved construction and arrangement in an instrument of this type, and for a consideration of what is believed to be novel and the invention, attention is directed to the accompanying description and the claims appended thereto.

Figure 1:
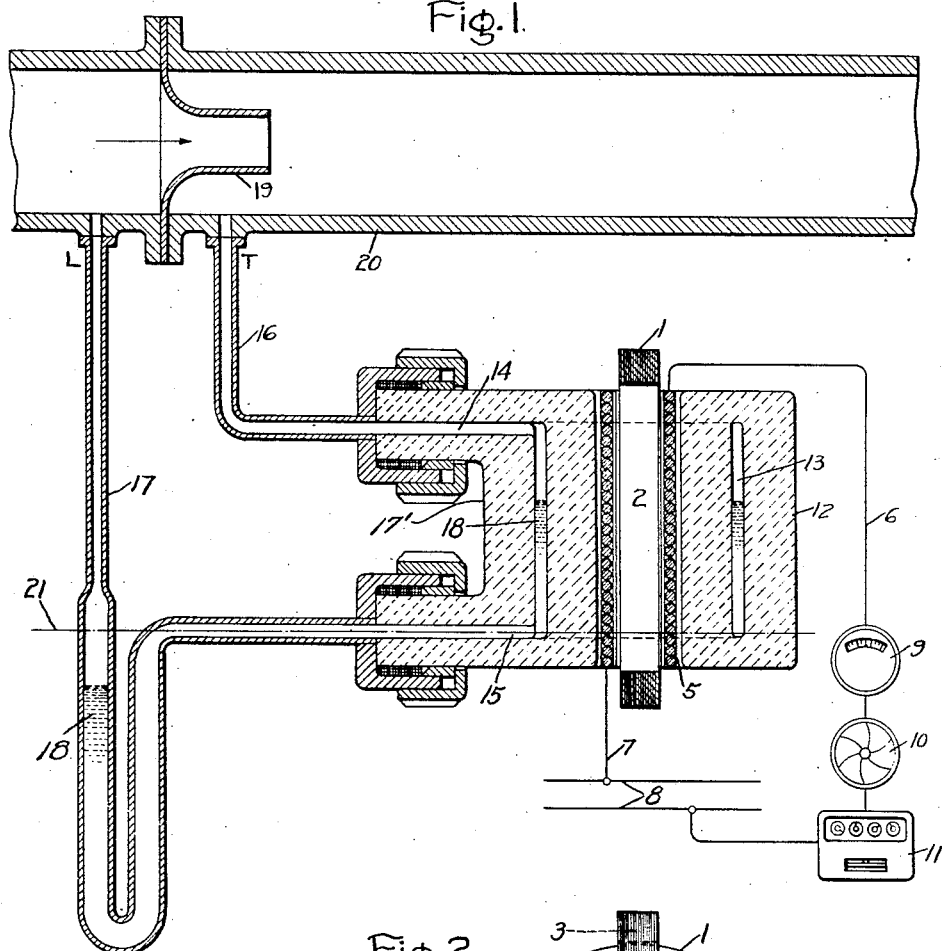
Figure 2:
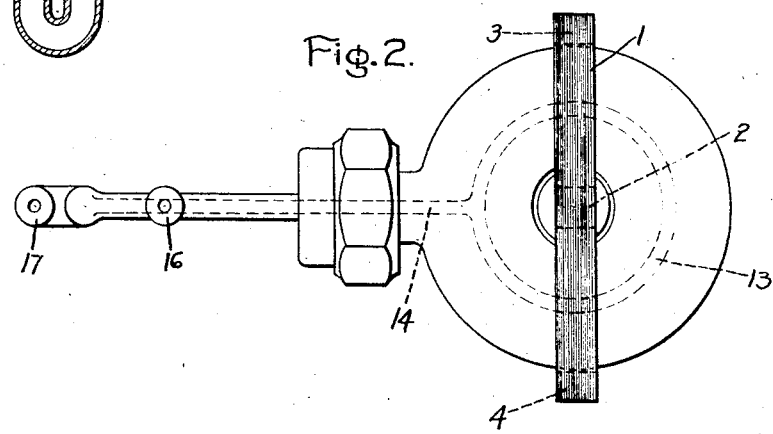

In the drawing, Fig. 1 is a sectional view, partly diagrammatic, of a structure embodying the invention, and Fig. 2 is a top plan view.

Referring to the drawing, 1 indicates a transformer core constructed of suitable laminations and comprising three legs, a middle leg 2 and outer legs 3 and 4. On middle leg 2 is a primary winding 5 which is shown in the present instance as comprising a single layer of suitably insulated wire. The terminals 6 and 7 of winding 5 are connected to a source of alternating current 8 and in the circuit connections are suitable measuring instruments, an indicating ammeter 9, a curve drawing ammeter 10, and a watt hour meter 11 being shown in the present instance. Surrounding winding 5 is a casing 12 of diamagnetic material in which is an annular vertically extending chamber 13, and communicating with the upper and lower ends of chamber 13 are passages 14 and 15. Connected to passage 14 is a trailing or lower pressure pipe 16. Connected to passage 15 is a leading or higher pressure pipe 17 which has a loop 17ᵃ and which for a portion of its length extends along parallel to chamber 13, thus forming a U-tube one leg of which comprises chamber 13 and the other the parallel portion of pipe 17. In this U-tube is a liquid 18 such as mercury which is a conductor of electricity. Viewed from another aspect, it will be seen that the casing structure comprises two spaced annular walls which define between them the annular chamber 13 and that the inner casing wall defines also a central vertical passage open at its two ends and through which extends the middle leg 2 of the transformer core.

In the present instance, the construction is shown as being embodied in a flow meter and to this end trailing and leading pipes 16 and 17 are shown as being connected to a pressure difference creating device 19 located in a conduit 20 through which the fluid to be metered flows. A known form of pressure difference creating device usually termed a flow nozzle is shown in the drawing.

When the pressures in pipes 16 and 17 are equal, the liquid columns in the two legs of the U-tube stand at the same level, which may be termed the zero level and is indicated by the line 21. At this time the liquid ring which exists in chamber 13 may be broken or almost broken so that but little if any current will be induced in it and there will be minimum current flowing in the primary winding 5 and in the indicating circuit. The ammeters 9 and 10 may be calibrated so that under this condition they read zero and the integrating meter 11 may be compensated so that it does not move.

Now when flow takes place in conduit 20, the pressure difference creating device creates a pressure difference which bears a definite relation to the rate of flow, and this pressure difference being applied to liquid 18 through pipes 17 and 16 causes the liquid to lower in pipe 17 and rise in chamber 13, thereby building up a liquid ring of greater cross sectional area and hence of less resistance in chamber 13. This causes more current to flow in the primary winding 5. The flow of current in primary winding 5 increases with increase in the depth of the liquid in chamber 13, (i. e. with decrease in its resistance) and thus becomes a measure of the pressure difference and hence of the flow through conduit 20. The measuring instruments 9, 10 and 11 may be calibrated in any suitable terms. For example, they may be calibrated to read directly in terms of flow through conduit 20.

It will be understood that the device may be used to measure any desired pressure or pressure difference and for any purpose to which it may be found applicable.

The above described arrangement has the advantage that the primary winding of the transformer is located outside the annular chamber in which the liquid forming the closed secondary is located and hence such liquid does not come into physical contact with the winding. As a result of this there is no danger of the liquid short circuiting turns of the primary winding or in any way adversely affecting such winding due to its physical contact therewith. Also, since casing 12 is independent of winding 5, it may be constructed in the manner best suited to meet the requirements in any particular instance.

The casing 12 is supported independently of core 1 and winding 5 and concentric with the middle leg 2. By this arrangement it may be turned on its vertical axis relatively to the core so that passages 14 and 15 may be made to face in any desired direction. This is of assistance often in installing the instrument, for it enables the casing 12 to be turned to make passages 14 and 15 face in the direction from which the pipes 16 and 17 come.

What I claim as new and desire to secure by Letters Patent of the United States, is:

1. In combination, an annular casing having a vertically-extending annular chamber therein which chamber is closed at its upper and lower ends, means connected with the casing and forming with the chamber therein a U-tube of which the chamber forms at least a portion of one leg, a transformer core associated with the casing, and a primary winding on the core, said winding being outside said chamber.

2. In an instrument of the character described, a casing comprising two spaced annular walls which define between them an annular chamber closed at its upper and lower ends, and said inner annular wall defining a passage open at its ends, a transformer core entirely outside the casing having one leg located in said passage, a primary winding on said core, conduits connected with the upper and lower ends of said annular chamber and forming therewith a U-tube on which said annular chamber forms at least a portion of one leg, and a conducting liquid in said chamber.

3. In an instrument of the character described, a casing comprising two spaced annular walls which define between them an annular chamber closed at its upper and lower ends, and said inner annular wall defining a passage open at its ends, a transformer core entirely outside the casing having one leg located in said passage, a primary winding on said one leg, conduits connected with the upper and lower ends of said annular chamber and forming therewith a U-tube of which said annular chamber forms at least a portion of one leg, and a conducting liquid in said chamber.

4. In an instrument of the character described, the combination of a transformer core, a casing surrounding a leg of the core in concentric relation therewith, said casing providing a vertical annular chamber closed at its lower end, a primary winding on the core outside said chamber, and a tubular member connected to the lower end of said annular chamber and extending parallel to the casing whereby it forms with the chamber a U-tube of which the chamber forms at least a portion of one leg.

In witness whereof, I have hereunto set my hand this 13th day of February 1925.

MAX WEISS.

CERTIFICATE OF CORRECTION.

Patent No. 1,658,699.  Granted February 7, 1928, to

MAX WEISS.

It is hereby certified that error appears in the printed specification of the above numbered patent requiring correction as follows: Page 2, line 59, claim 2, for the word "on" read "of"; and that the said Letters Patent should be read with this correction therein that the same may conform to the record of the case in the Patent Office.

Signed and sealed this 6th day of March, A. D. 1928.

Seal

M. J. Moore,
Acting Commissioner of Patents.